March 24, 1925. 1,530,947
J. A. KIMBALL
PUSH BUTTON OPERATING DEVICE
Filed Dec. 7, 1923
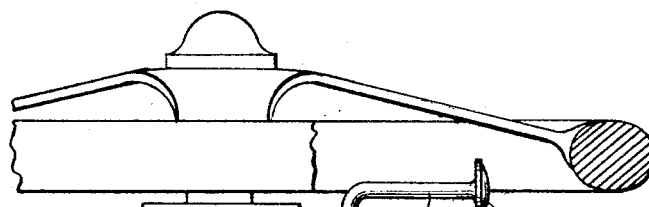
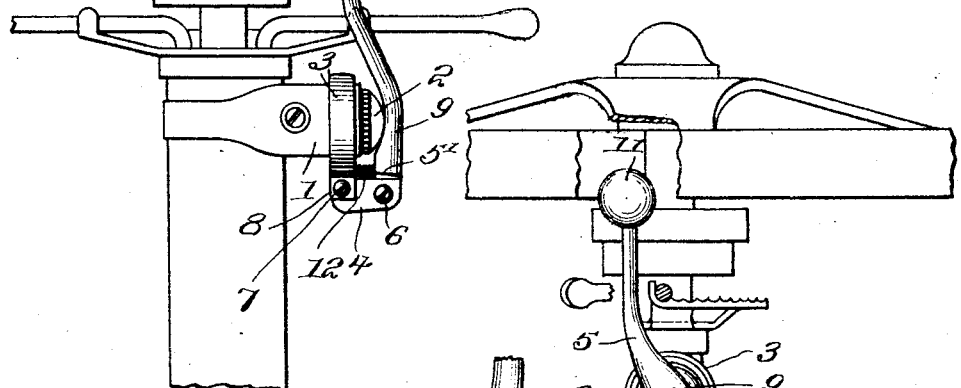
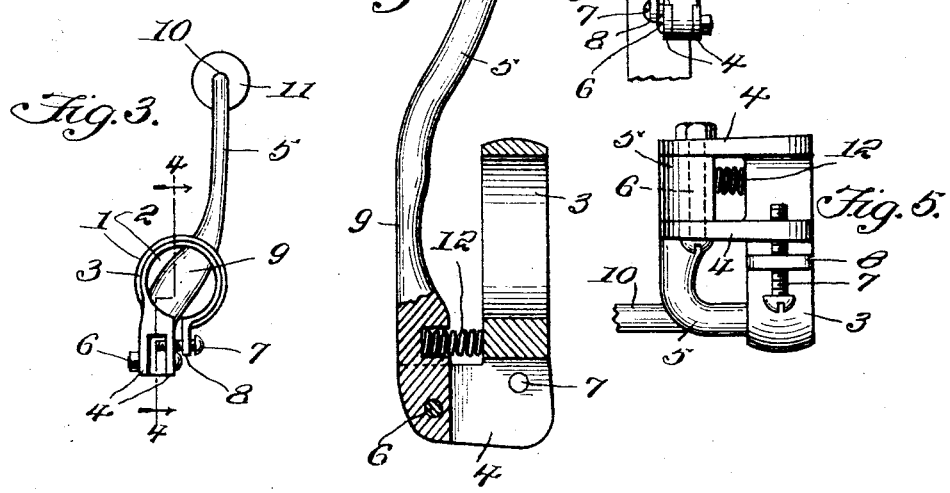
John A. Kimball
INVENTOR
BY Victor J. Evans
ATTORNEY
J. T. L. Wright
WITNESS:

Patented Mar. 24, 1925.

1,530,947

UNITED STATES PATENT OFFICE.

JOHN A. KIMBALL, OF TAYLORVILLE, ILLINOIS.

PUSH-BUTTON-OPERATING DEVICE.

Application filed December 7, 1923. Serial No. 679,223.

*To all whom it may concern:*

Be it known that I, JOHN A. KIMBALL, a citizen of the United States, residing at Taylorville, in the county of Christian and State of Illinois, have invented new and useful Improvements in Push-Button-Operating Devices, of which the following is a specification.

This invention relates to an attachment for motor vehicles, the general object of the invention being to provide means for operating the signal means of the vehicle without removing the hand from the steering wheel.

Another object of the invention is to so form the attachment that it can be easily and quickly attached to a vehicle by a clamping ring which engages the push button on the steering column.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the invention in use.

Figure 2 is a view taken at right angles to Figure 1.

Figure 3 is a rear view of the attachment.

Figure 4 is an enlarged sectional view on the line 4—4 of Figure 3.

Figure 5 is an end view of the device.

In the Ford type of motor vehicle the casing 1 of the push button 2, which controls the circuit of the signal device of the vehicle, is located on the steering post below the steering wheel so that the operator must remove his hand from the steering wheel in order to actuate the button. It is the object of my invention to permit the operator to actuate the button without removing his hand from the steering wheel so that he can operate the vehicle and sound his horn at the same time.

My invention comprises a split ring 3 for engaging the casing of the button, one end of the ring being formed with ears 4 between which the operating lever 5 is pivoted by the bolt 6. Shoulders 5' on the lever engaging the ears limit the outward movement of the lever. The screw 7 for connecting together the two ends of the ring engages one of these ears and an offset part 8 on the other end of the ring. The lever 5 is provided with an enlarged part 9 which extends at an angle over the central part of the ring and has its under face of curved formation to engage the button. The upper part of the lever is provided with a right-angularly extending part 10 which is provided with a head 11 and the lever is of such a length that the parts 10 and 11 will come within the space enclosed by the rim of the wheel so that the head can be easily engaged by the fingers without removing the hand from the wheel. The lever is normally held in its outer position by means of the coil spring 12 which has one end engaging a socket formed in the lever and its other end engaging a part of the split ring. This spring will prevent the lever from actuating the button due to movement imparted to the lever by the jolting of the vehicle.

From the foregoing it will be seen that the attachment can be easily and quickly attached to the vehicle by simply clamping the ring on the casing of the push button so that it is not necessary to use any screws or the like in fastening the device to the vehicle. The lever is so formed that it will permit the button to be pushed inwardly with the least possible effort and without interfering at all with the steering of the vehicle. Thus this device will tend to reduce accidents as it will permit the driver to sound his horn by a simple movement of one finger so that his attention is not detracted from the driving operation in his efforts to locate and operate the push button and when the driver becomes familiar with the location of the device he will operate the same almost unconsciously.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An attachment of the class described comprising a clamping ring adapted to engage the push button of the signal device of a motor vehicle, a lever pivoted to a projecting part on the clamping ring and having an offset part extending over the center of the ring and having its inner part curved to engage the push button, the upper end of the lever extending at right angles and having a finger engaging part thereon which is located within the circle of the wheel so that it can be engaged by the finger without removing the hand from the steering wheel and spring means for normally holding the lever in its outer position.

2. An attachment for a motor vehicle comprising a clamping ring for engaging the push button casing of the signal means of the vehicle, a pair of ears carried by the ring, a lever pivoted between the ears and having a part thereon forming a stop for limiting the outward movement of the lever, spring means for holding the lever in its outermost position, said lever having an offset part extending over the center of the ring and having its inner face curved to engage the push button, the upper end of the lever being bent at right-angles and having a head thereon which is located within the circle of the wheel adjacent the rim so that it can be engaged by the finger without removing the hand from the steering wheel.

In testimony whereof I affix my signature.

JOHN A. KIMBALL.